Nov. 5, 1940. W. M. DAY Re. 21,614

PIANO FALL-BOARD

Original Filed Dec. 10, 1937

INVENTOR

Wilbur M. Day

Reissued Nov. 5, 1940 Re. 21,614

UNITED STATES PATENT OFFICE 21,614

PIANO FALL-BOARD

Wilbur M. Day, Norwood, Ohio, assignor to The Baldwin Company, Cincinnati, Ohio

Original No. 2,178,565, dated November 7, 1939, Serial No. 179,163, December 10, 1937. Application for reissue June 5, 1940, Serial No. 339,003

12 Claims. (Cl. 84—179)

This invention relates to a piano fall-board adaptable for use in upright pianos and particularly in uprights known at "flat-tops," in which the action is below the keyboard level to some extent. One of the objects of the invention is to provide a fall-board mechanism that is simple of construction, in that the key covering portion consists of a single unit.

Another object is to provide a fall-board that may be more easily moved to cover or uncover the keys of the piano than fall-boards of the usual types, and that will be quiet in its operations.

A further object is to provide a key cover, which when in closed position, presents an unbroken flat surface.

Still another object is to provide an economy of construction in that it requires no visible, finished hardware parts, and in that it may be easily installed in the piano.

With these objects in mind and any other objects which may occur to those skilled in the art reading these specifications, I now proceed to a specific description of the invention, reference being made to the accompanying drawing wherein.

Figure 1:
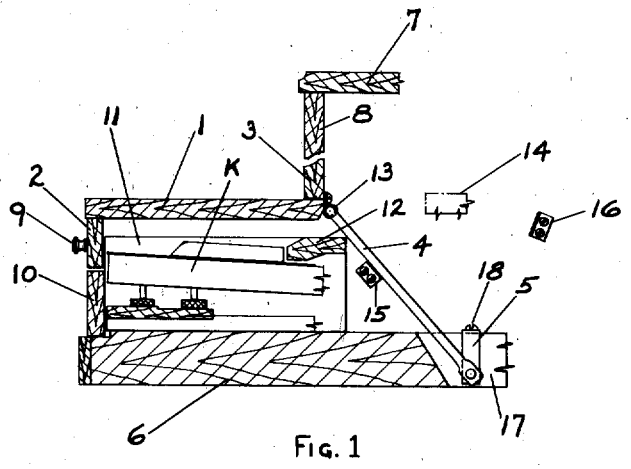
Figure 1 is a sectional, fragmentary side view of a piano, taken just inside of the right-hand arm and with the right-hand key block removed, including a fall-board constructed in accordance with the present invention, showing the fall-board in a closed position over the operable portions of the keys.

The fall-board assembly comprises a main horizontal member 1 above the manually operable part of the keyboard K, this member being provided with a front lip 2, and a back fill-in strip 3, together with a swinging equalizer rod 4, the ends of which are pivoted on bearing blocks 5 attached to the keybed 6.

In conjunction with the fall-board assembly are shown the shelf 7, the shelf drop 8, the fall-board handles or knobs 9, the keyslip 10, the key block 11, and a strip 12 immediately back of the sharps or black keys of the keyboard, which strip is commonly known as the key strip. It will be understood, of course, that there is a key block 11 at each end of the keyboard.

Figure 2:
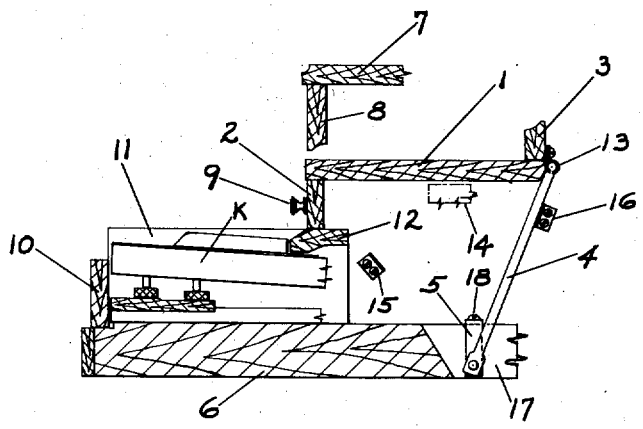
Figure 2 shows the fall-board in its open position, exposing the operable portions of the keys for use.
Figure 3:
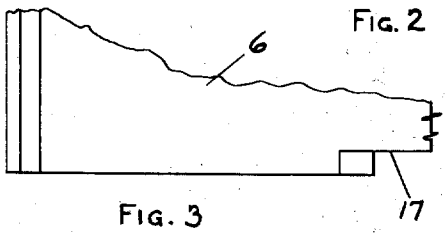
Figure 3 is a plan view of one end of a keybed adapted for convenient use with the present invention.

The operation of the fall-board from its closed position as shown in Figure 1 to the open position shown in Figure 2 so as to expose the keys, comprises raising the front of the board by means of the knobs 9 and pushing the board rearwardly, the ends of the lower surface of the front lip 2 sliding on the upper surfaces of the key blocks 11. The equalizer rod 4, the longitudinal portion of which runs along the back edge of the horizontal member 1, being attached to same by bushed bearing clips 13, causes both ends of the fall-board to recede with equal movement at the same time, preventing jamming in the process of uncovering the keys. The turned down ends of the equalizer rod are pivoted on the bearing plates 5, placed as shown so that the back of the fall-board rises as it recedes, so as to clear the near-by parts of the piano action 14 and at the ends of its motion to leave the front lip 2 in a vertical position for pleasing appearance. The reverse of the above operation is employed in closing the board.

The extreme forward and backward positions of the fall-board are determined by the stop blocks 15 and 16. It will be noted that the lower surface of the shelf drop 8 is inclined upwardly and rearwardly, and corresponding to this the upper surface of the back strip 3 is likewise inclined upwardly and rearwardly. This effects a neat closure while preventing the two members, 3 and 8, from fouling each other in the movement of the board.

It will thus be evident to those skilled in the art that a fall-board constructed according to this invention is readily applicable to flat-top pianos.

In order to attach the fall-board mechanism conveniently in the production of pianos, the rear part of each end of the keybed 6 has been cut away as at 17, and each plate 5 is of L-shaped body, one part of which rests on the bed 6 to be held thereto by a vertical wood-screw 18. The other, or vertical part of the L is adjacent the bed in the space 17 and supports a horizontal cylindrical pivot. It will thus be seen that the fall-board mechanism may be attached to the piano conveniently from above.

Having thus described my invention, I claim:

1. In combination in a musical instrument, a horizontal keyboard, stationary pivoting means located considerably below the level of said keyboard and considerably behind the front playable portion thereof, a fall-board comprising essentially a rigid member of sufficient extent to cover said keyboard front portion and disposed horizontally over said portion, pivoting means secured to said fall-board considerably in front of said first mentioned pivoting means, and arms pivotally connected to said first mentioned means and extending therefrom to pivotal connections with said second mentioned means, whereby said fall-board, in exposing said keyboard front portion, describes a rearward and upward translatory movement.

2. The combination as set forth in claim 1, including a board supported immediately behind said keyboard front portion and dependent above said portion, said fall-board including an upright portion in substantially coplanar relationship with said dependent board and spaced apart therefrom, and a strip supported immediately in front of said keyboard, said fall-board including a dependent portion in substantially coplanar relationship with said strip, whereby front and rear closures are completed when said fall-board is in a covering position and permitting said fall-board to be moved as set forth.

3. The combination as set forth in claim 1, including a strip supported immediately in front of said keyboard, said fall-board including a dependent portion in substantially coplanar relationship with said strip, a board supported immediately behind said keyboard front portion and depending above said portion, said fall-board including an upright portion in substantially coplanar relationship with said dependent board and spaced apart slightly therefrom, the lower edge of said dependent board and the upper edge of said upright portion being inclined rearwardly and upwardly in corresponding relationship, whereby smooth front and rear closures are completed when said fall-board is in a covering position and permitting said fall-board to be moved as set forth.

4. In combination in a musical instrument, a horizontal keyboard, stationary pivoting means located beyond each end of said keyboard, considerably below the level thereof and considerably behind the front playable portion thereof, a fall-board comprising essentially a rigid member of sufficient extent to cover said keyboard front portion and disposed horizontally over said portion, pivoting means secured to said fall-board considerably in front of said first mentioned pivoting means, and a rectangular U member pivotally connected at its ends to said first mentioned means and extending therefrom to pivotal connections with said second mentioned means, whereby said fall-board, in exposing said keyboard front portion, describes a rearward and upward translatory movement, in equalized motion.

5. The combination as set forth in claim 4, including a board supported immediately behind said keyboard front portion and dependent above said portion, said fall-board including an upright portion in substantially coplanar relationship with said dependent board and spaced apart therefrom, and a strip supported immediately in front of said keyboard, said fall-board including a dependent portion in substantially coplanar relationship with said strip, whereby front and rear closures are completed when said fall-board is in a covering position and permitting said fall-board to be moved as set forth.

6. The combination as set forth in claim 4, including a strip supported immediately in front of said keyboard, said fall-board including a dependent portion in substantially coplanar relationship with said strip, a board supported immediately behind said keyboard front portion and depending above said portion, said fall-board including an upright portion in substantially coplanar relationship with said dependent board and spaced apart slightly therefrom, the lower edge of said dependent board and the upper edge of said upright portion being inclined rearwardly and upwardly in corresponding relationship, whereby smooth front and rear closures are completed when said fall-board is in a covering position and permitting said fall-board to be moved as set forth.

7. In combination in a musical instrument, a horizontal keyboard, stationary pivoting means located considerably below the level of said keyboard and considerably behind the front playable portion thereof, a fall-board of sufficient extent to cover said keyboard front portion and disposed horizontally over said portion, pivoting means secured to said fall-board considerably in front of said first mentioned pivoting means, and arms pivotally connected to said first mentioned means and extending therefrom to pivotal connections with said second mentioned means, whereby said fall-board, in exposing said keyboard front portion, describes a rearward and upward translatory movement, and means limiting the movement of said fall-board between a forward position covering said keyboard front portion and a rearward position exposing said portion.

8. In combination in a musical instrument, a horizontal keyboard, stationary pivoting means located beyond each end of said keyboard, considerably below the level thereof and considerably behind the front playable portion thereof, a fall-board of sufficient extent to cover said keyboard front portion and disposed horizontally over said portion, pivoting means secured to said fall-board considerably in front of said first mentioned pivoting means, and a rectangular U member pivotally connected at its ends to said first mentioned means and extending therefrom to pivotal connections with said second mentioned means, whereby said fall-board, in exposing said keyboard front portion, describes a rearward and upward translatory movement, in equalized motion, and means limiting the movement of said fall-board between a forward position covering said keyboard front portion and a rearward position exposing said portion.

9. In combination in a musical instrument, a horizontally disposed keyboard, a fall-board comprising essentially a rigid member of sufficient extent to cover the front playable portion of said keyboard and disposed in a covering position over said portion, pivoting means secured to said fall-board, stationary pivoting means located sufficiently behind and below said first mentioned means, and arms pivotally connected to said first mentioned means and extending therefrom to pivotal connections with said second mentioned means, whereby said fall-board, in exposing said keyboard front portion, describes a rearward and upward translatory movement.

10. The combination as set forth in claim 9, including a board supported immediately behind said keyboard front portion and dependent above said portion, said fall-board including an upright portion in substantially coplanar relationship with said dependent board and spaced apart therefrom, and a strip supported immediately in front of said keyboard, said fall-board including a dependent portion in substantially coplanar relationship with said strip, whereby front and rear closures are completed when said fall-board is in a covering position and permitting said fall-board to be moved as set forth.

11. In combination in a musical instrument, a horizontally disposed keyboard, a fall-board comprising essentially a rigid member of sufficient extent to cover the front playable portion of said keyboard and disposed in a covering position over said portion, pivoting means secured to said fall-board, stationary pivoting means located sufficiently behind and below said first mentioned means, and a rectangular U member pivotally connected at its ends to said second mentioned means and extending therefrom to pivotal connections with said first mentioned means, whereby said fall-board, in exposing said keyboard front portion, describes a rearward and upward translatory movement, in equalized motion.

12. The combination as set forth in claim 11, including a board supported immediately behind said keyboard front portion and dependent above said portion, said fall-board including an upright portion in substantially coplanar relationship with said dependent board and spaced apart therefrom, and a strip supported immediately in front of said keyboard, said fall-board including a dependent portion in substantially coplanar relationship with said strip, whereby front and rear closures are completed when said fall-board is in a covering position and permitting said fall-board to be moved as set forth.

WILBUR M. DAY.